US007762126B2

(12) United States Patent
Shibuya

(10) Patent No.: US 7,762,126 B2
(45) Date of Patent: Jul. 27, 2010

(54) LEAKAGE DIAGNOSIS APPARATUS AND METHOD FOR DIAGNOSING PURGE APPARATUS FOR INTERNAL COMBUSTION ENGINE

(75) Inventor: Hisatoshi Shibuya, Handa (JP)

(73) Assignee: Denso Corporation, Kariya (JP)

( * ) Notice: Subject to any disclaimer, the term of this patent is extended or adjusted under 35 U.S.C. 154(b) by 487 days.

(21) Appl. No.: 11/711,902

(22) Filed: Feb. 28, 2007

(65) Prior Publication Data

US 2007/0199374 A1 Aug. 30, 2007

(30) Foreign Application Priority Data

Feb. 28, 2006 (JP) ............................ 2006-053470

(51) Int. Cl.
*G01M 15/00* (2006.01)
*F02M 33/04* (2006.01)
*F02M 33/02* (2006.01)
*F02B 77/08* (2006.01)

(52) U.S. Cl. ................. 73/114.39; 123/520; 123/198 D

(58) Field of Classification Search .............. 73/114.38, 73/114.39; 123/198 D, 519, 520
See application file for complete search history.

(56) References Cited

U.S. PATENT DOCUMENTS 6,363,921 B1 * 4/2002 Cook et al. ................. 123/520
6,405,718 B1 * 6/2002 Yoshioka et al. ............ 123/520
6,550,318 B2 * 4/2003 Isobe et al. .............. 73/114.39
6,564,780 B2 * 5/2003 Hanai et al. ................. 123/520
6,698,280 B1 * 3/2004 Iden et al. ................ 73/114.39
6,701,777 B2 * 3/2004 Yamaguchi et al. .......... 73/49.7
6,804,995 B2 * 10/2004 Kawano .................. 73/114.39
6,971,375 B2 12/2005 Amano et al.
7,255,093 B2 * 8/2007 Iihoshi et al. ............... 123/518
7,347,194 B2 * 3/2008 Sato ........................... 123/520
7,418,953 B2 * 9/2008 Annoura ..................... 123/520
7,497,209 B2 * 3/2009 Annoura ..................... 123/520
7,565,900 B2 * 7/2009 Sato et al. ................... 123/516
2006/0042605 A1 3/2006 Amano et al.

FOREIGN PATENT DOCUMENTS

JP 2004-293438 10/2004

* cited by examiner

*Primary Examiner*—Lisa M Caputo
*Assistant Examiner*—Punam Roy
(74) *Attorney, Agent, or Firm*—Nixon & Vanderhye P.C.

(57) ABSTRACT

A leakage diagnosis apparatus is applied to a purge apparatus of an internal combustion engine. The purge apparatus includes a canister accommodating an adsorbent for temporarily absorbing fuel vapor produced in a fuel tank. The fuel vapor is desorbed from the adsorbent and purged into an intake passage of the internal combustion engine. A diagnosis unit performs a leakage diagnosis to detect leakage in the purge apparatus. A state measurement unit measures a fuel vapor state of mixture containing the fuel vapor, which is desorbed from the adsorbent. A command unit commands the diagnosis unit to perform the leakage diagnosis at a predetermined time. An evaluating unit evaluates the leakage diagnosis to be performed in an appropriate state on the basis of a change between the fuel vapor state before the leakage diagnosis and the fuel vapor state after the leakage diagnosis.

8 Claims, 7 Drawing Sheets

LEAKAGE DIAGNOSIS APPARATUS AND METHOD FOR DIAGNOSING PURGE APPARATUS FOR INTERNAL COMBUSTION ENGINE

CROSS REFERENCE TO RELATED APPLICATIONS

This application is based on and incorporates herein by reference Japanese Patent Application No. 2006-53470 filed on Feb. 28, 2006.

FIELD OF THE INVENTION

The present invention relates to a leakage diagnosis apparatus. The present invention further relates to a method for diagnosing a purge apparatus for an internal combustion engine.

BACKGROUND OF THE INVENTION

A purge apparatus restricts fuel vapor, which is produced in a fuel tank, from diffusing into the atmosphere. In such a purge apparatus, fuel vapor is introduced from a fuel tank into a canister accommodating an adsorbent therein, so that the absorbent temporarily adsorbs the fuel vapor. The fuel vapor adsorbed into the adsorbent is desorbed from the adsorbent by negative pressure generated in an intake pipe, so that the fuel vapor is turned into mixture. The mixture is emitted, and purged into the intake pipe of an internal combustion engine through a purge passage, during an operation of the internal combustion engine.

When, in such a purge apparatus, any leaking hole exists in the passage for introducing fuel vapor into the intake pipe of the internal combustion engine, the canister, or the like, fuel vapor may be emitted to the atmosphere through the leaking hole. When a leaking hole exists in the purge apparatus, the leaking hole needs to be early detected.

In, for example, a leakage diagnosis apparatus disclosed in JP-A-2004-293438, pressure in the purge apparatus is detected when the pressure decreases or increases, thereby a leakage diagnosis is performed to evaluate whether a leaking hole exists in the purge apparatus on the basis of the pressure or the change in the pressure. In this structure, existence or nonexistence of the leaking hole is diagnosed by detecting the pressure in the purge apparatus. For example, when fuel shakes in the fuel tank or when fuel vapor in a large amount is produced in the fuel tank, the pressure in the purge apparatus is liable to change. In such a condition, in which the pressure is liable to change in the purge apparatus, it is difficult to accurately perform the leakage diagnosis. In the above leakage diagnosis apparatus, therefore, the leakage diagnosis is executed in an idling state where the pressure in the purge apparatus becomes stable, or after the engine is stopped. Immediately after the engine stop, however, fuel temperature becomes higher due to, for example, heat generated in a fuel pump provided in the fuel tank. Consequently, a large amount of fuel vapor is produced, and the pressure in the purge apparatus is not stabilized. Accordingly, the leakage diagnosis after the engine stop is executed upon lapse of a predetermined time period, which is required for stabilization of the pressure in the purge apparatus.

However, pressure may still fluctuate in the purge apparatus, even when the leakage diagnosis is executed upon the lapse of the predetermined time period, in which production of fuel vapor is assumed to be stabilized, since the engine stop. Specifically, for example, when highly volatile fuel is used, fuel vapor may increase in the purge apparatus by decreasing pressure in the purge apparatus due to performing the leakage diagnosis. When the leakage diagnosis is performed in such a condition, the pressure in the purge apparatus changes due to the production of fuel vapor, and hence, the leakage diagnosis cannot be precisely performed.

Apart from the case of using highly volatile fuel, the leakage diagnosis cannot be precisely performed in the following conditions. For example, when a vehicle is being transported or towed while the engine of the vehicle stops, fuel vapor is produced by shaking fuel. Alternatively, when altitude of the vehicle changes, fuel vapor may be further produced due to change in pressure.

SUMMARY OF THE INVENTION

The present invention addresses the above disadvantage. According to one aspect of the present invention, a leakage diagnosis apparatus for a purge apparatus of an internal combustion engine, the purge apparatus including a canister accommodating an adsorbent for temporarily absorbing fuel vapor produced in a fuel tank and for purging the fuel vapor desorbed from the adsorbent into an intake passage of the internal combustion engine, the leakage diagnosis apparatus including a diagnosis unit for performing a leakage diagnosis to detect leakage in the purge apparatus. The leakage diagnosis apparatus further includes a state measurement unit for measuring a fuel vapor state of mixture containing the fuel vapor desorbed from the adsorbent. The leakage diagnosis apparatus further includes a command unit for commanding the diagnosis unit to perform the leakage diagnosis at a predetermined time. The leakage diagnosis apparatus further includes an evaluating unit for evaluating the leakage diagnosis to be performed in an appropriate state on the basis of a change between the fuel vapor state before the leakage diagnosis and the fuel vapor state after the leakage diagnosis.

According to another aspect of the present invention, a leakage diagnosis apparatus for a purge apparatus of an internal combustion engine, the purge apparatus including an adsorbent for temporarily absorbing fuel vapor and desorbing the fuel vapor into an intake passage of the internal combustion engine, the leakage diagnosis apparatus including a diagnosis unit for performing a leakage diagnosis to detect leakage in the purge apparatus on the basis of pressure in the purge apparatus. The leakage diagnosis apparatus further includes a state measurement unit for measuring a fuel vapor concentration in mixture containing the fuel vapor. The leakage diagnosis apparatus further includes an evaluating unit for evaluating the leakage diagnosis to be performed in an appropriate state on the basis of a change between the fuel vapor concentration before the leakage diagnosis and the fuel vapor concentration after the leakage diagnosis.

According to another aspect of the present invention, a method for diagnosing a purge apparatus, for purging fuel vapor into an intake passage of an internal combustion engine, includes desorbing fuel vapor, which is temporarily absorbed into an adsorbent of the purge apparatus, from the adsorbent. The method further includes measuring a fuel vapor state of mixture containing the fuel vapor. The method further includes detecting leakage in the purge apparatus. The method further includes evaluating whether the detecting of leakage is in an appropriate state on the basis of a change between the fuel vapor state before the detecting of leakage and the fuel vapor state after the detecting of leakage.

According to another aspect of the present invention, a method for diagnosing a purge apparatus, for purging fuel vapor into an intake passage of an internal combustion engine, includes desorbing fuel vapor, which is temporarily absorbed into an adsorbent of the purge apparatus, from the adsorbent. The method further includes measuring a fuel vapor concentration in mixture containing the fuel vapor. The method further includes detecting leakage in the purge apparatus on the basis of pressure in the purge apparatus. The method further includes evaluating whether the detecting of leakage is in an appropriate state on the basis of a change between the fuel vapor concentration before the leakage diagnosis and the fuel vapor concentration after the leakage diagnosis. The method further includes repeating the detecting of leakage when the leakage diagnosis is in a state other than the appropriate state.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF PREFERRED EMBODIMENTS

Embodiment

Figure 1:
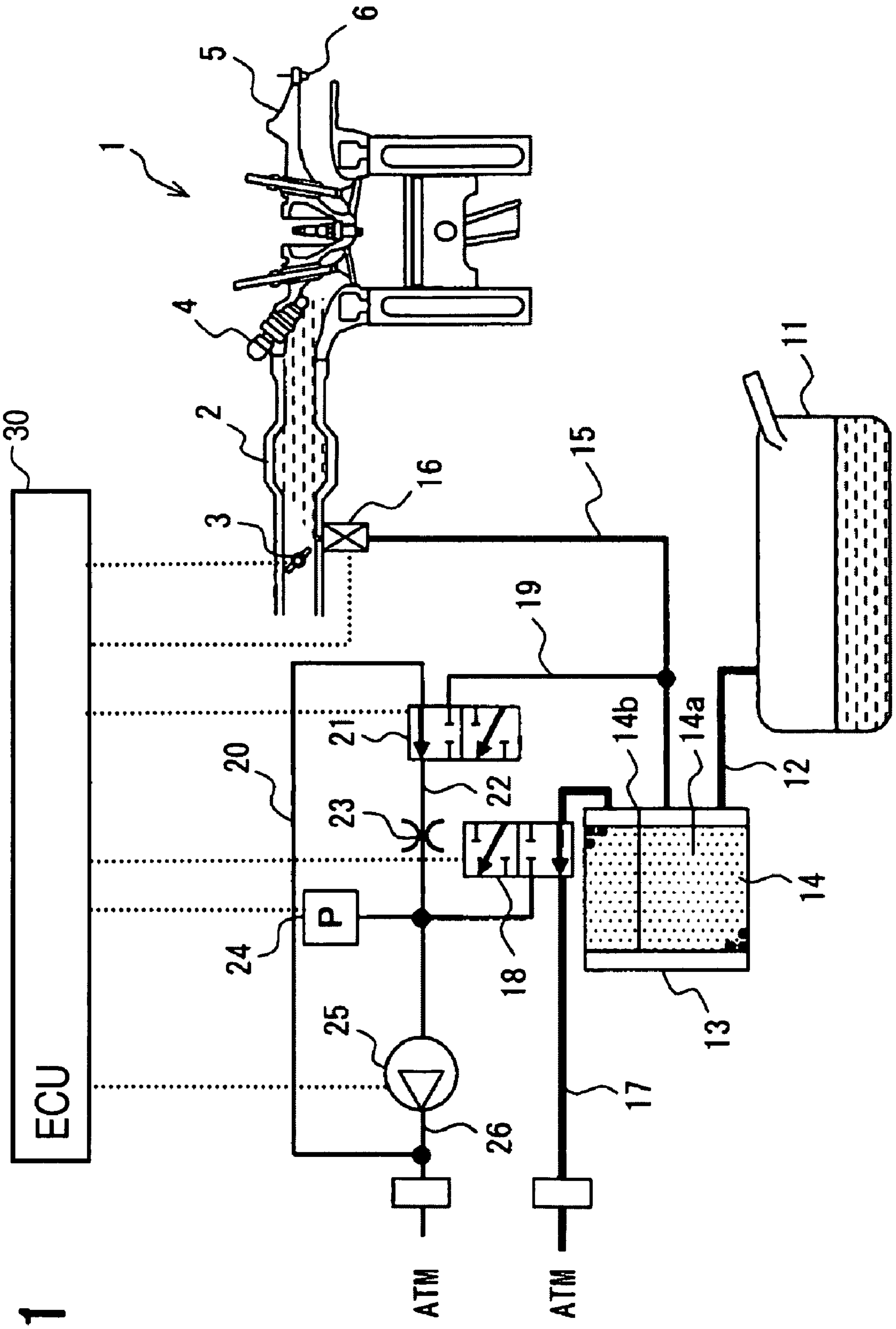
FIG. 1 is a schematic diagram showing a purge apparatus.

A fuel vapor processor shown in FIG. 1 is applied to, for example, an internal combustion engine 1 of an automobile.

A fuel tank 11 of the engine 1 connects with a canister 13 through an evaporation line 12, which is a vapor introduction passage. The canister 13 is filled up with an adsorbent 14. Fuel vapor produced in the fuel tank 11 is temporarily adsorbed by the adsorbent 14. The canister 13 connects with the intake pipe 2 of the engine 1 through a purge line 15. The purge line 15 is provided with a purge valve 16. The canister 13 and the intake pipe 2 are held in communication when the purge valve 16 communicates therein.

A partition plate 14*a* is provided between the connection, in which the evaporation line 12 connects with the canister 13, and the connection, in which the purge line 15 connects with the canister 13. The partition plate 14*a* extends into the adsorbent 14 in the canister 13.

The partition plate 14*a* restricts fuel vapor, which is introduced into the canister 13 through the evaporation line 12, from being emitted through the purge line 15 without being adsorbed into the adsorbent 14. An atmospheric line 17 also connects with the canister 13. A partition plate 14*b* is provided in the canister 13. The partition plate 14*b* has substantially the same depth as the filling depth of the adsorbent 14. The partition plate 14*b* is located between the connection, in which the atmospheric line 17 connects with the canister 13, and the connection, in which the purge line 15 connects with the canister 13. The partition plate 14*b* restricts fuel vapor introduced into the canister 13 through the evaporation line 12, from being emitted directly through the atmospheric line 17.

An electronic control unit (ECU 30, shown in FIG. 1) is provided for controlling the engine 1. The purge valve 16 is a solenoid valve, for example. The ECU controls opening degree of the purge valve 16, thereby controlling flow rate of mixture, which contains fuel vapor flowing through the purge line 15. The mixture controlled in flow rate is purged into the intake pipe 2, as being drawn by negative pressure in the intake pipe 2. The negative pressure in the intake pipe 2 is controlled using a throttle valve 3. The mixture purged into the intake pipe 2 is combusted together with injected fuel from an injector 4. The mixture, which contains fuel vapor to be purged, is referred as purge gas.

The atmospheric line 17 has a tip end opening to the atmosphere through a filter. The atmospheric line 17 connects with the canister 13. The atmospheric line 17 is provided with a switching valve 18, which communicates the canister 13 with either one of the atmospheric line 17 and a suction port of a pump 25. When the ECU does not operate the switching valve 18, the switching valve 18 is in a first position, in which the canister 13 communicates with the atmospheric line 17. When the ECU operates the switching valve 18, the switching valve 18 is switched to a second position, in which the canister 13 communicates with the suction port of the pump 25 while bypassing a throttle 23, thereby establishing a second switching unit. The switching valve 18 is switched to the second position in a leakage diagnosis mode. In the leakage diagnosis mode, it is checked whether any leaking hole, which incurs leakage of fuel vapor, exists in the evaporation line 12, the purge line 15, the canister 13, and the like.

A branch line 19 is branched from the purge line 15. The branch line 19 connects with one input port of a two-position valve 21. An air feed line 20 connects with the other input port of the two-position valve 21. The air feed line 20 is branched from a delivery line 26 of the pump 25. The delivery line 26 is open to the atmosphere through a filter. The output port of the two-position valve 21 connects with a measurement line 22. The ECU switches the two-position valve 21 to either one of a first position, in which the air feed line 20 connects with the measurement line 22, and a second position, in which the branch line 19 connects with the measurement line 22. When the ECU does not operate the two-position valve 21, the two-position valve 21 is in the first position.

The measurement line 22 is provided with the throttle 23 and the pump 25. The pump 25 is a motor pump, for example. The pump 25 serves as a stream generating unit. When the ECU operates the pump 25, the pump 25 draws gas into the suction port of the pump 25 through the measurement line 22 and the throttle 23. The ECU turns the pump 25 ON and OFF, and controls the revolution of this pump. In operating the pump 25, the ECU controls the pump 25 such that the revolution may become constant at a predetermined value set beforehand. When the ECU operates the pump 25 in a state where the two-position valve 21 is in the first position with the switching valve 18 held in the first position, a first measurement state is established. In this first measurement state, air is circulated through the measurement line 22, thereby establishing a first switching unit. When the ECU operates the pump 25 in a state where the two-position valve 21 is in the second position, a second measurement state is established. In the second measurement state, the purge gas is drawn into the measurement line 22 through the atmospheric line 17, the canister 13, a part of the purge line 15 extending to the branch line 19, and the branch line 19.

A pressure sensor 24 connects with the downstream of the measurement line 22 with respect to the throttle 23. That is, the pressure sensor 24 connects with the measurement line 22 between the throttle 23 and the pump 25. When air or the purge gas is circulated, the pressure sensor 24 detects negative pressure generated when the air or the purge gas passes through the throttle 23. The pressure sensor 24 outputs a pressure signal to the ECU.

The ECU controls the position of the throttle valve 3 provided in the intake pipe 2 for controlling an intake air amount, and controls a fuel injection amount from the injector 4, and the like, on the basis of detection signals of various sensors. By way of example, the ECU controls the fuel injection amount, the throttle position, and the like on the basis of the intake air amount, intake pressure, an air/fuel ratio, an ignition signal, the revolution of the engine 1, temperature of engine cooling water, an accelerator position, and the like. The intake air amount is detected using an airflow sensor provided in the intake pipe 2. The intake pressure is detected using an intake pressure sensor. The air/fuel ratio is detected using an air/fuel ratio sensor 6 provided in an exhaust pipe 5.

Figure 2:
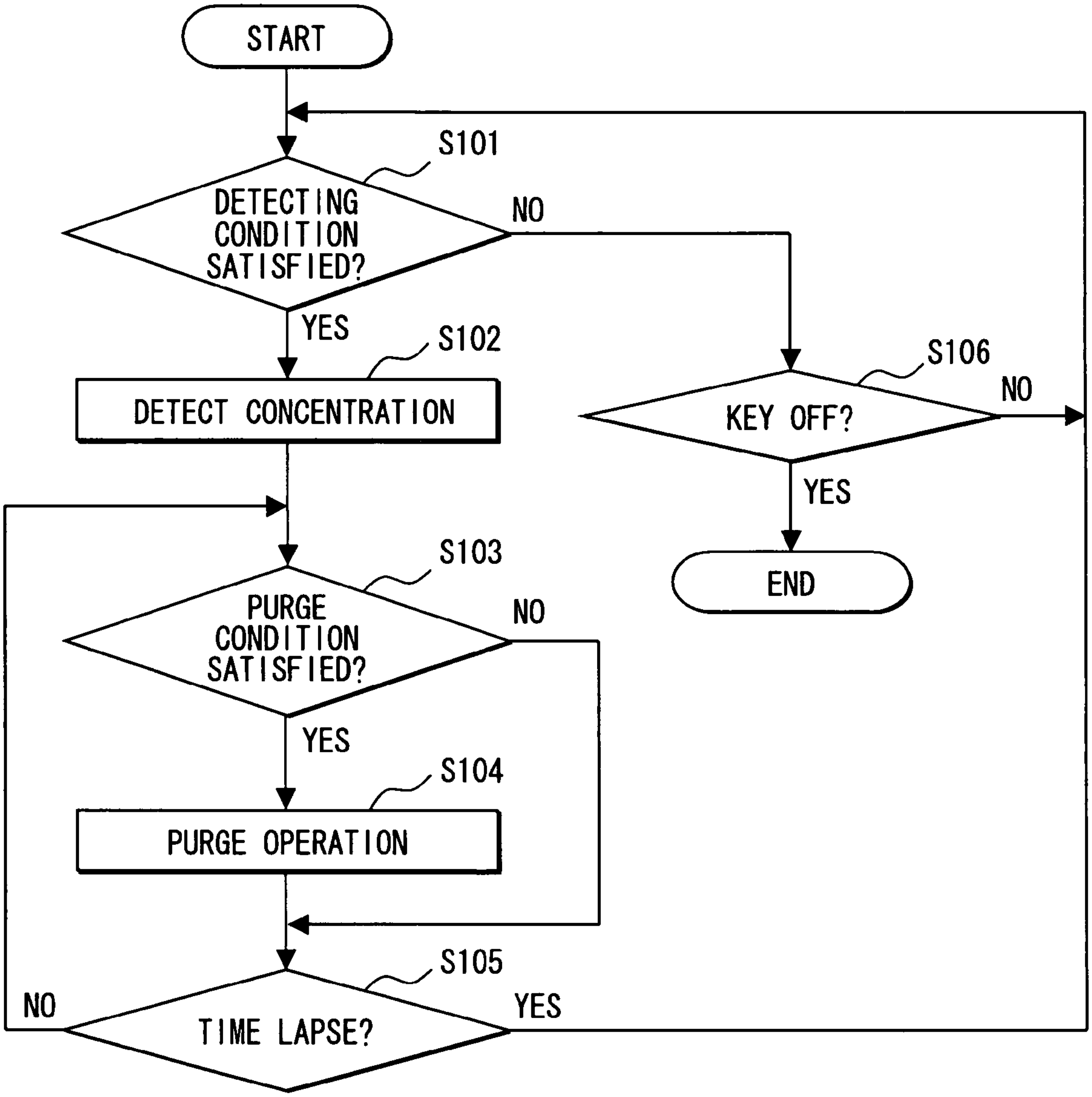
FIG. 2 is a flow chart showing a purge control.

The ECU performs a purge control for treatment of fuel vapor, in addition to the controls mentioned above. The purge control is described with reference to FIG. 2. The ECU performs this purge control when the engine 1 starts an operation.

In step S101, the ECU evaluates whether a concentration detecting condition is satisfied. The concentration detecting condition is satisfied when state variables representing operating states, such as the water temperature of the engine 1, oil temperature of the engine 1, and the revolution of the engine 1, are in predetermined regions. The concentration detecting condition is satisfied before a purge condition is satisfied. In this purge condition, a purge operation of fuel vapor is enabled.

The purge condition is satisfied, for example, when the engine cooling water temperature becomes equal to or greater than a predetermined value T1, so the completion of the warming-up of the engine is determined. The concentration detecting condition needs to be satisfied before the completion of the engine warming-up. Therefore, the concentration detecting condition is satisfied, for example, when the cooling water temperature is equal to or greater than a predetermined value T2, which is set less than the predetermined value T1. The concentration detecting condition is satisfied also in a period, in which the purge operation of fuel vapor is terminated during the engine operation, mainly, in a deceleration period. When the purge apparatus is applied to a hybrid car, which employs the internal combustion engine and an electric motor as power sources, the concentration detecting condition is satisfied also when the car is caused to travel by the motor, with the engine stopped.

When the ECU determines in step S101 that the concentration detecting condition is satisfied, the routine proceeds to step S102, in which the ECU detects the concentration of fuel vapor in the purge gas.

A concentration detecting operation is described with reference to FIG. 3. In a period A before the concentration detecting operation, components are in an initial state. Specifically, the purge valve 16 is blocked therein, the switching valve 18 is in the first position, in which the canister 13 communicates with the atmospheric line 17, and the two-position valve 21 is in the first position, in which the air feed line 20 communicates with the measurement line 22. In this initial state, the pressure, which is detected using the pressure sensor 24, becomes substantially equal to the atmospheric pressure. In a state corresponding to the first measurement state, the air is circulated through the measurement line 22 as the gas stream. In this state, the pressure sensor 24 detects a pressure P0. In the period B in FIG. 3, the ECU performs the measurement of the pressure P0 based on the air stream. The ECU performs the measurement of the pressure P0 by operating the pump 25 with the two-position valve 21 held in the first position. In this condition, the measurement line 22 is fed with air through the air feed line 20. Accordingly, the pressure sensor 24 detects pressure (negative pressure), which is generated when air is circulated through the measurement line 22 and the air passes through the throttle 23.

In this condition, the pressure sensor 24 repeatedly detects pressure in the downstream of the throttle 23 at, for example, predetermined time intervals after the operation of the pump 25. Thus, the pressure sensor 24 detects a convergent value of the pressure P0 of the air stream upon the establishment of a steady state where the air stream is circulated at a speed corresponding to a constant revolution of the pump 25.

Next, the pressure sensor 24 detects a pressure P1 in the second measurement state, in which the purge gas is circulated through the measurement line 22 as the gas stream. The measurement of the pressure P1 based on the purge gas stream is performed in the period C in FIG. 3. The measurement of the pressure P1 is performed by operating the pump 25 while the two-position valve 21 is being switched to the second position. In this condition, the purge gas is fed through the atmospheric line 17, the canister 13, the part of the purge line 15 extending to the branch line 19, and the branch line 19, so that the purge gas is circulated through the measurement line 22. That is, the air introduced from the atmospheric line 17 is circulated through the interior of the canister 13, thereby to form the purge gas, which is the mixture containing fuel vapor and the air. The purge gas is fed into the measurement line 22 through the part of the purge line 15 and the branch line 19. In this pressure measurement based on the purge gas stream, accordingly, the pressure sensor 24 detects pressure (negative pressure), which is generated when the purge gas is circulated through the measurement line 22 and the purge gas passes through the throttle 23.

In this condition, the pressure sensor 24 repeatedly detects the pressure in the downstream of the throttle 23 at, for example, predetermined time intervals after the operation of the pump 25, in the same manner as in the pressure measurement based on the air stream. In this way, the ECU obtains the convergent value of the pressure P1 based on the purge gas stream.

The ECU obtains the pressure P0 based on the air stream and the pressure P1 based on the purge gas stream, so that the ECU calculates a fuel vapor concentration on the basis of the pressure P0 and P1. The ECU stores the fuel vapor concentration for the purge control. The ECU estimates the fuel vapor concentration by, for example, multiplying the pressure ratio between the pressure P0 and P1 by a predetermined coefficient.

Here, in this second measurement state, in which the measurement line 22 communicates with the canister 13, as the density of the fuel vapor contained in the purge gas becomes greater, the fuel vapor concentration becomes greater, so that the difference in pressure generated by the purge gas passing through the throttle 23 increases. The pressure ratio between the pressure P0 in the downstream of the throttle 23, when air passes through the throttle 23, and pressure P1 in the downstream of the throttle 23, when the purge gas passes through the throttle 23, is substantially proportional relative to the fuel vapor concentration. Therefore, the ECU can estimate the fuel vapor concentration in accordance with the pressure ratio between the pressure P0 and P1.

More specifically, as generally known as the Bernoulli's principle, the change rate (pressure drop) of pressure of fluid passing through a throttle corresponds to the density of the fluid. Therefore, difference of densities between the purge gas and air can be determined on the basis of the pressure ratio between the pressure P0, P1. The difference of densities corresponds to the fuel vapor concentration of the purge gas. Therefore, the fuel vapor concentration of the purge gas can be determined in accordance with the pressure ratio between the pressure P0, P1.

When the ECU completes the above concentration detecting operation, the ECU brings the state of the purge apparatus into a purge holding state. This switching into the purge holding state corresponds to the period D in FIG. 3. The ECU performs this switching by stopping the pump 25 with switching the two-position valve 21 to the first position. The purge holding state is the same as the initial state.

In the subsequent step S103, the ECU evaluates whether the purge condition is satisfied. The ECU evaluates the purge condition on the basis of operating states such as the water temperature of the engine, oil temperature of the engine, and the revolution of the engine, similarly to that in a conventional purge apparatus. When the ECU determines in step S103 that the purge condition is satisfied, the routine proceeds to step S104, in which the ECU performs the purge operation.

In performing the purge operation, the ECU obtains the engine operation states thereby calculating the flow rate of the purge gas on the basis of the engine operation states. The ECU calculates the purge gas flow rate, for example, on the basis of the lower-limit value of the fuel injection amount controllable by the injector 4, and the like, so that fuel in an amount corresponding to the fuel injection amount required under the current engine operation states corresponding to, such as, throttle position may be fed by the purge gas and the injected fuel from the injector 4. The ECU calculates the opening degree of the purge valve 16 corresponding to the purge gas flow rate, on the basis of the fuel vapor concentration. The ECU communicates the purge valve 16 therein in accordance with the calculated opening degree. Thus, even when the ECU performs the purge operation, the ECU is capable of precisely controlling the air/fuel ratio at a target value.

Figure 3:
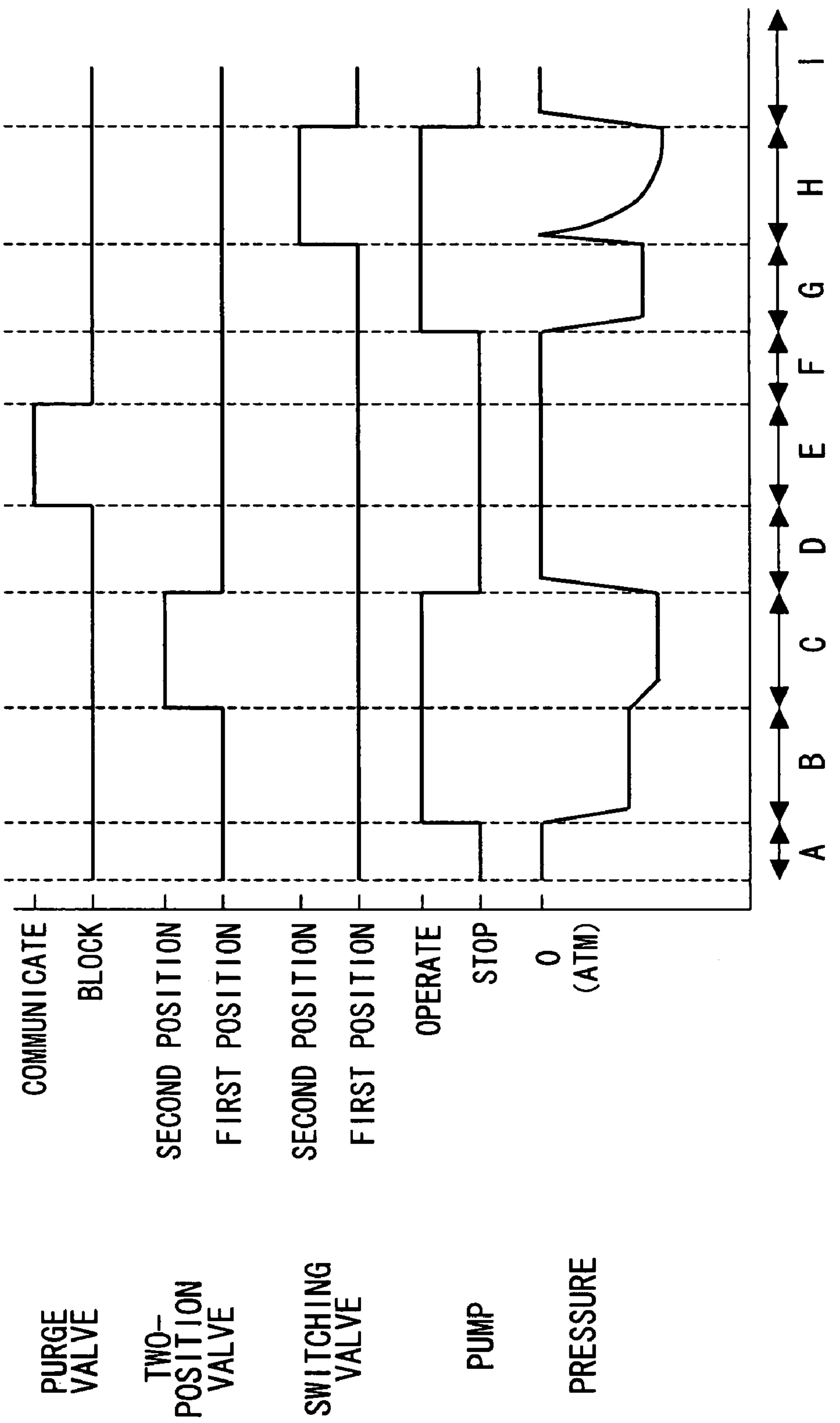
FIG. 3 is a time chart showing an operation of the purge control.

The period of the purge operation corresponds to the period E in FIG. 3. During the period E, the ECU communicates the purge valve 16 therein at the calculated opening degree, while the two-position valve 21 and the switching valve 18 are held respectively in the first positions. As a result, owing to the negative pressure in the intake pipe 2, fuel vapor is desorbed from the adsorbent 14 in the canister 13, and the purge gas containing fuel vapor is purged into the intake pipe 2 through the purge line 15.

When the ECU determines the purge condition not to be satisfied in step S103 or where the ECU performs the purge operation in step S104, the routine proceeds to step S105 in which the ECU evaluates whether a predetermined time period lapses since the detection of the fuel vapor concentration. When the ECU determines in step S105 the predetermined time period not to lapse, the routine returns to step S103. When the ECU determines the predetermined time period to lapse since the detection of the fuel vapor concentration, the routine returns to step S101, in which the processing of detecting the fuel vapor concentration is executed anew so as to update the fuel vapor concentration to the latest value.

When the ECU determines in step S101 the concentration detecting condition not to be satisfied, the routine proceeds to step S106. In step S106, the ECU evaluates whether an ignition key is turned OFF. When the ECU determines that the ignition key is not turned OFF, the routine returns to step S101. When the ECU determines that the ignition key is turned OFF, the ECU terminates the routine in FIG. 2.

Next, a leakage diagnosis operation of the purge apparatus is described. As shown in FIG. 1, fuel vapor is diffusible through the evaporation line 12, the canister 13, the purge line 15 leading to the purge valve 16, and the like in the purge apparatus. Accordingly, when any leaking hole exists in that range of the purge apparatus through which fuel vapor diffuses, fuel vapor may be emitted to the atmosphere through the leaking hole. The purge apparatus performs the leakage diagnosis operation for restricting fuel vapor from being emitted to the atmosphere. Next, the leakage diagnosis operation is described with reference to FIG. 4.

In step S201, the ECU evaluates whether a leakage diagnosis condition is satisfied. The leakage diagnosis condition is satisfied when the running time period of the vehicle continues for, at least, a certain time period or when an atmospheric temperature is equal to or greater than certain temperature. In accordance with the OBD regulations in the USA, the conditions for leakage inspection are defined as follows:

the engine runs for, at least, 600 seconds at an atmospheric temperature of, at least, 20° F. and at a height less than 8000 feet above the sea level; and running at or above 25 miles per hour has cumulated for, at least, 300 seconds, including continuous idling for, at least, 30 seconds.

Figure 4:
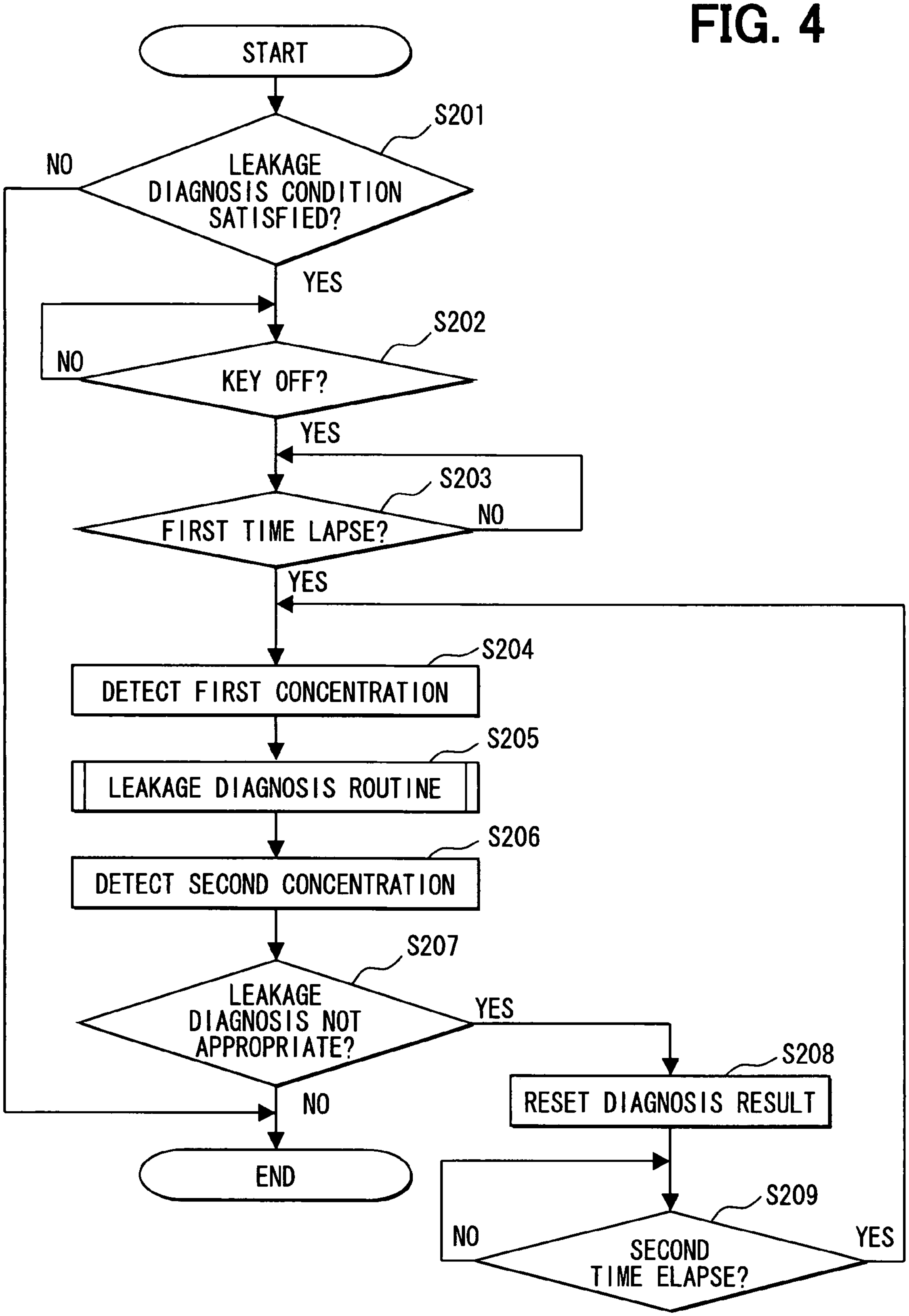
FIG. 4 is a flow chart showing a leakage diagnosis operation.

When the ECU determines in step S201 the leakage diagnosis condition not to be satisfied, the ECU terminates the routine in FIG. 4. When the ECU determines the leakage diagnosis condition to be satisfied in step S201, the routine proceeds to step S202, in which the ECU evaluates whether the ignition key is turned OFF, that is, the operation of the engine 1 is stopped. Subject to determination that the ignition key is not turned OFF, the ECU stands-by in step S202 until the ignition key is turned OFF.

When the ECU determines in step S202 the ignition key to be turned OFF to stop the engine 1, the routine proceeds to step S203, in which the ECU evaluates whether a first predetermined time period lapses since the stop of the engine 1. The first predetermined time period is set at the minimum time period, such as 3 hours, in which pressure in the purge apparatus becomes stable after the stop of the running of the engine 1. Establishing this condition, in which pressure in the purge apparatus becomes stable after the stop of the engine 1, takes a particular time period. That is, the condition suitable for the leakage diagnosis is established after elapsing this time period subsequent to the stop of the engine 1. This time period fluctuates in a range of, for example, 3-5 hours under the influences of an environment, where the vehicle is placed, such as the atmospheric temperature, solar radiation, radiation heat from the ground, and wind.

In this embodiment, the first predetermined time period is set by reference to the minimum time period in the range of the fluctuating time period. When the ECU determines in step S203 the first predetermined time period to lapse, the routine proceeds to step S204. When the ECU determines in step S203 the first predetermined time period not to lapse, the ECU stands-by in step S203 until the first predetermined time period lapses.

In step S204, the ECU detects a fuel vapor concentration (first concentration) as a fuel vapor state in the purge gas, before performing the leakage diagnosis. The concentration detecting operation of the fuel vapor concentration is carried out by the same procedure as in the foregoing. In the subsequent step S205, the ECU executes a leakage diagnosis routine. After executing the leakage diagnosis routine in step S205, the routine proceeds to step S206, in which the ECU detects a fuel vapor concentration (second concentration) as a fuel vapor state in the purge gas again.

In step S207, the ECU evaluates whether the leakage diagnosis is executed in an appropriate state. Specifically, the ECU evaluates whether the second concentration, which is the concentration after the execution of the leakage diagnosis, becomes greater than the first concentration, which is the concentration before the execution of the leakage diagnosis, and whether the difference between the second and first concentrations is equal to or greater than a predetermined positive value, which is a threshold.

That is, the ECU evaluates whether the following condition is satisfied in step S207:

second concentration−first concentration≧predetermined positive threshold

When the concentration, after the leakage diagnosis, becomes greater than the concentration, before the leakage diagnosis, by the predetermined positive threshold or greater, the ECU may especially liable to cause an erroneous determination is the leakage diagnosis.

In the case where the concentration, after the leakage diagnosis, becomes greater than the concentration, before the leakage diagnosis, by the predetermined positive threshold or greater, pressure in the purge apparatus may fluctuate to become greater due to the increase in fuel vapor concentration during the execution of the leakage diagnosis routine.

In this condition, by way of example, the pressure (negative pressure) to be detected becomes higher in spite of the nonexistence of a leaking hole. Consequently, existence of the leaking hole might be erroneously determined under the influence of the higher detection pressure. Therefore, when step S207 makes a positive determination, the ECU determines that an erroneous determination may be made in step S207, so that the routine proceeds to step S208. In step S208, the ECU resets, i.e., clears the diagnostic result obtained in the leakage diagnosis routine.

In step S209, the ECU evaluates whether a second predetermined time period lapses since the execution of the leakage diagnosis routine in step S205. The second predetermined time period is set at, for example, 30 minutes or one hour, to be less than the first predetermined time period. Furthermore, subject to the determination that the second predetermined time period lapses in step S209, the ECU repeats the processing from step S204.

In this embodiment, the first predetermined time period is set at the time period such as the minimum time period, in which pressure in the purge apparatus becomes stable. When the ECU determines the state of the leakage diagnosis after lapsing the first predetermined time period to be unsuitable for the leakage diagnosis, the ECU executes the leakage diagnosis again after the lapse of the second predetermined time period. Accordingly, when the purge apparatus becomes in the state suitable for the leakage diagnosis, the ECU is capable of executing the leakage diagnosis at a good responsibility.

Insofar as step S207 makes a positive determination, the ECU repeatedly executes the leakage diagnosis routine. Thus, the ECU is capable of obtaining occasions to perform the leakage diagnosis operations in the appropriate state where pressure in the purge apparatus becomes stable.

A limitation may well be imposed on the number of the executions of the leakage diagnosis routine after the stop of the engine 1. In a case, for example, where a fuel of high volatility is used in the vehicle, the limitation can restrict wasteful power consumption of a battery attributed to repeated executions of the leakage diagnosis routine.

When step S207 makes a negative determination, the leakage diagnosis is regarded as being executed in the appropriate state where pressure in the purge apparatus becomes stable, subsequently, the ECU terminates the routine in FIG. 4. In this condition, the ECU retains the diagnostic result, which is based on the diagnosis routine executed in step S205.

Figure 5:
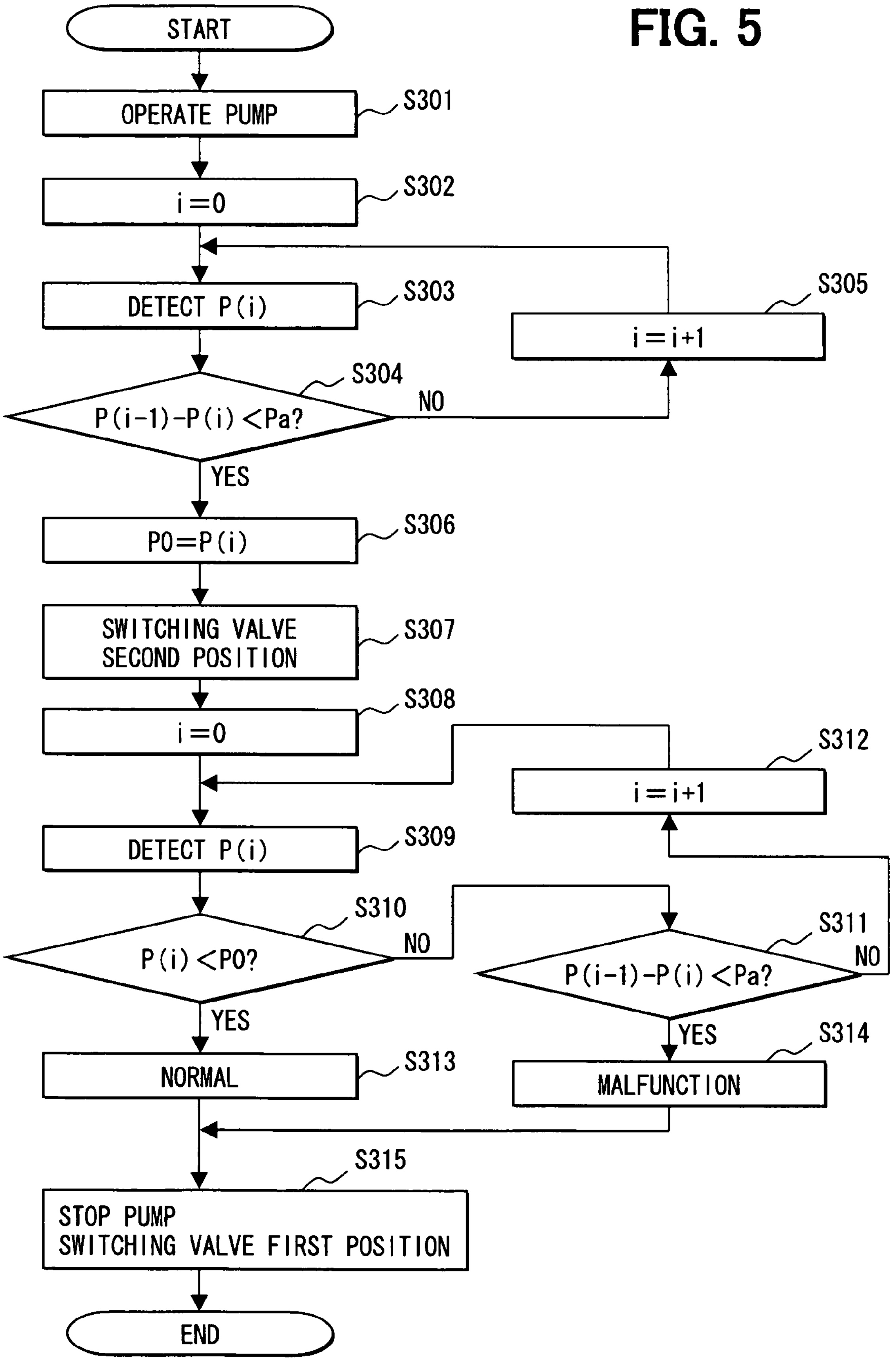
FIG. 5 is a flow chart showing a leakage diagnosis routine.

Next, the leakage diagnosis routine is described with reference to FIGS. 3, 5. The period F in FIG. 3 corresponds to a wait period of the leakage diagnosis routine, and periods G and H correspond to a leakage diagnosis period based of the leakage diagnosis routine. In FIG. 3, operations for the concentration detecting operations before and after the leakage diagnosis routine are omitted for the sake of brevity.

Figure 6:
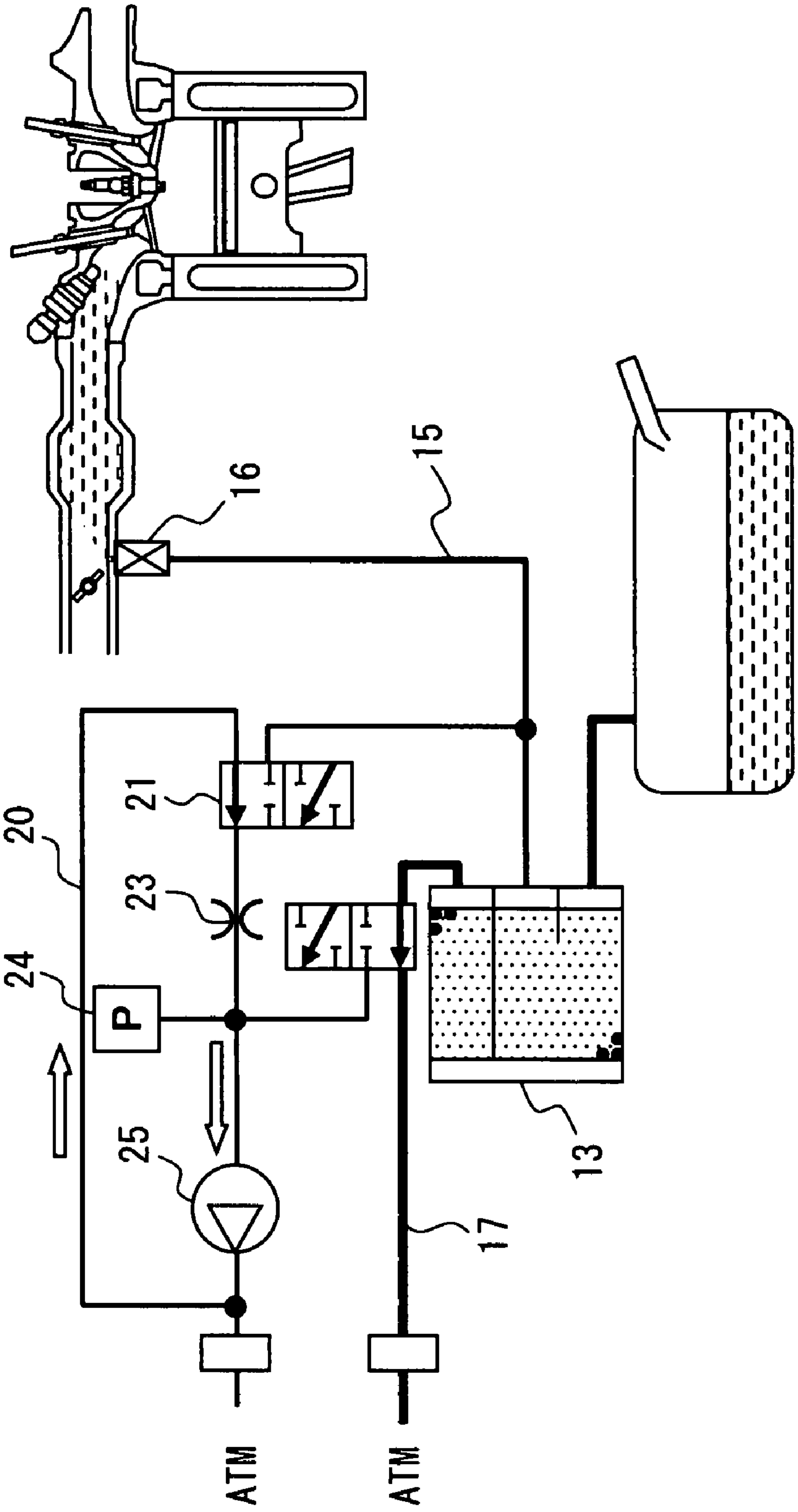
FIGS. 6, 7 are schematic diagrams showing the purge apparatus in a concentration measurement.

In step S301, the pump 25 is turned ON, and operated. In this condition, both the switching valve 18 and the two-position valve 21 in the purge apparatus are in the first positions. This state is equivalent to the first state in the concentration measurement. That is, as shown in FIG. 6, air is circulated through the measurement passage 22 (FIG. 1), so that the pressure (negative pressure) is generated in the air passing through the throttle 23. In step S302, the ECU initializes a variable i to zero. In step S303, the ECU detects a pressure P(i).

In step S304, the ECU evaluates the difference (P(i−1)−P(i)) between a measurement pressure P(i−1) at the previous time and the measurement pressure P(i) at the current time. Specifically, the ECU compares the difference (P(i−1)−P(i)) with a threshold Pa, so as to evaluate whether the difference (P(i−1)−P(i)) is less than the threshold Pa. More specifically, as shown in the period G of FIG. 3, the measurement pressure P(i) lowers with the lapse of time since the start of the pump 25, and the measurement pressure P(i) thereafter converges gradually to a pressure value, which is stipulated by the cross-sectional area defining the passage in the throttle 23, and the like. Thus, in step S304, the ECU evaluates whether the measurement pressure reaches the convergent value.

When step S304 makes a negative determination, the routine proceeds to step S305, in which the ECU increments the variable i by one, subsequently, the routine returns to step S303. When step S304 makes a positive determination, the routine proceeds to step S306. In step S306, the ECU substitutes the measurement pressure P(i) into the reference pressure P0 of the leakage diagnosis. Thus, the reference pressure P0 is set at the pressure, which is generated by the air passing through the throttle 23 as being circulated through the measurement passage 22.

Figure 7:
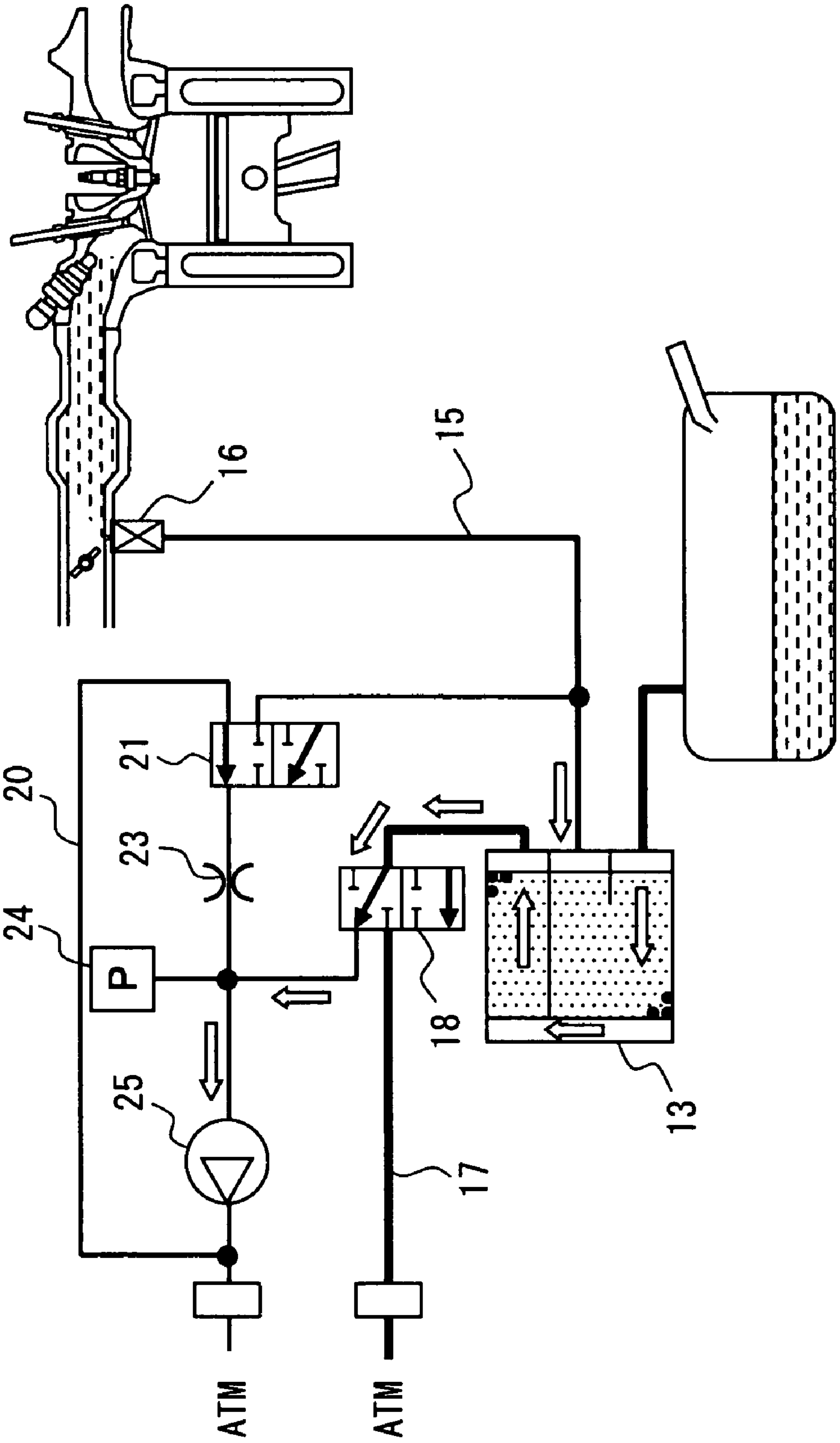

In step S307, the ECU switches the switching valve 18 to the second position, so that the purge apparatus is brought into a state shown in the period H of FIG. 3. In this condition, as shown in FIG. 7, the pump 25 draws the purge gas, from the fuel tank 11, the evaporation line 12, the canister 13, the purge line 15, and the like, into the measurement passage 22 on the downstream of the throttle 23, while bypassing the throttle 23. Thus, pressure in the purge apparatus is decreased.

The interior of the purge apparatus is sealed. Therefore, when a leaking hole does not exit, the convergent pressure of the measurement pressure P(i) in this condition becomes less than the reference pressure P0. In other words, when the convergent pressure of the measurement pressure P(i) does not decrease down to the reference pressure P0, the ECU can determine that a leaking hole greater than the passage cross-sectional area of the throttle 23 in diameter exists in the purge apparatus. In steps S308-S314, accordingly, the ECU makes the comparison between the measurement pressure P(i) and the reference pressure P0, thereby determining normality and abnormality corresponding to nonexistence and existence of a leaking hole on the basis of the result of the comparison.

In step S308, the ECU initializes the variable i to zero. In step S309, the ECU detects pressure P(i). Subsequently, in step S310, the ECU compares the measurement pressure P(i) with the reference pressure P0. When step S310 makes a positive determination, the leaking hole can be regarded as being nonexistent in the purge apparatus, and hence, the routine proceeds to step S313. In step S313, the ECU determines the purge apparatus to be normal, and leakage not to be developing in the purge apparatus. When step S310 makes a negative determination, the routine proceeds to step S311. In an initial stage of the pressure measurement in the period H, the measurement pressure P(i), in general, does not decrease down to the reference pressure P0, and step S310 makes a negative determination.

In step S311, in the same manner as in step S304, the ECU compares the difference (P(i−1)−P(i)), which is between the measurement pressure P(i−1) at the previous time and the measurement pressure P(i) at the current time, with the threshold Pa. The ECU, thereby evaluates whether the measurement pressure P(i) reaches the convergent pressure. When step S311 makes a negative determination, the routine proceeds to step S312, in which the ECU increments the variable i by one, and the routine returns to step S309. When step S311 makes a positive determination, the measurement pressure P(i) does not decrease down to the reference pressure P0 in spite of reaching the convergent pressure. In this condition, a leaking hole greater than the passage cross-sectional area of the throttle 23 in diameter can be regarded as being existent in the purge apparatus. Accordingly, the routine proceeds to step S314, in which the ECU makes an abnormality determination. Thus, development of leakage is retained in this step S314.

As described above, the criterion of the evaluation, whether the leaking hole exists, is the passage cross-sectional area of the throttle 23. Accordingly, the throttle 23 is set in consideration of the area of the leaking hole, which is determined abnormal.

In step S315, the ECU stops the pump 25, and switches the switching valve 18 to the first position, to bring the state of the purge apparatus into the initial state.

According to this embodiment, the leakage diagnosis of the purge apparatus can be made by utilizing the measurement line 22 for measuring the fuel vapor concentration, the throttle 23, the pump 25, and the pressure sensor 24. Therefore, the configuration of the diagnosis apparatus can be simplified.

According to this embodiment, the ECU detects the fuel vapor concentrations before the execution of the leakage diagnosis and after the execution of the leakage diagnosis. Thereby, the ECU evaluates whether the leakage diagnosis is executed in the appropriate state where the pressure in the purge apparatus is substantially stable, on the basis of the change of the detected fuel vapor concentrations. Thus, even when the leakage diagnosis is not executed in the appropriate state due to, for example, use of highly volatile fuel or transportation, in which the internal combustion engine of the vehicle is shutdown, the ECU can determine the condition, and hence, an erroneous diagnosis can be restricted.

The condition suitable for the leakage diagnosis is established after elapsing this time period subsequent to the stop of the engine 1. This time period fluctuates under the influences of an environment, where the vehicle is placed, such as the atmospheric temperature, solar radiation, radiation heat from the ground, and wind. Conventionally, the leakage diagnosis is performed after lapsing a predetermined time period since stop of the engine 1. Conventionally, this predetermined time period is set sufficiently large in consideration of the maximum time period in which pressure in the purge apparatus becomes sufficiently stable. As a result, the engine 1 may be started again before lapsing the predetermined time since the stop of the engine 1. Consequently, the number of occasions for the leakage detection may not be sufficiently secured.

By contrast, in the above embodiment, the ECU evaluates whether the leakage diagnosis is properly performed. Therefore, the first time period, after which the ECU performs the leakage detection since stop of the engine 1, can be set less than the conventional predetermined time period. The ECU performed the leakage diagnosis after lapsing the first predetermined time period, and the ECU adopts the result of the leakage diagnosis when the leakage diagnosis is appropriately performed.

When the leakage diagnosis is not appropriately performed, the ECU performs the leakage diagnosis after lapsing the second predetermined time period, which is greater than the first time period, again. Thus, the ECU is capable of quickly performing the leakage diagnosis when the leakage diagnosis is appropriately performed.

By way of example, in the foregoing embodiment, the ECU calculates the fuel vapor concentration of the purge gas on the basis of the ratio between the pressure, which is generated by air passing through the throttle 23 when the air is circulated through the measurement line 22, and the pressure, which is generated when the purge gas is circulated. Alternatively, it is also allowed to employ a sensor such as an A/F sensor, which directly measures the fuel vapor concentration in the purge gas.

The above processings such as calculations and determinations are not limited being executed by the ECU. The control unit may have various structures including the ECU shown as an example.

It should be appreciated that while the processes of the embodiments of the present invention have been described herein as including a specific sequence of steps, further alternative embodiments including various other sequences of these steps and/or additional steps not disclosed herein are intended to be within the steps of the present invention.

Various modifications and alternations may be diversely made to the above embodiments without departing from the spirit of the present invention.

What is claimed is:

1. A leakage diagnosis apparatus for a purge apparatus of an internal combustion engine, the purge apparatus including a canister accommodating an adsorbent for temporarily absorbing fuel vapor produced in a fuel tank and for purging the fuel vapor desorbed from the adsorbent into an intake passage of the internal combustion engine, the leakage diagnosis apparatus comprising:

a diagnosis unit for performing a leakage diagnosis to detect leakage in the purge apparatus;

a state measurement unit for measuring a fuel vapor state of mixture containing the fuel vapor desorbed from the adsorbent;

a command unit for commanding the diagnosis unit to perform the leakage diagnosis at a predetermined time; and an evaluating unit for evaluating whether the leakage diagnosis is in an appropriate state, where pressure in the purge apparatus becomes stable, on the basis of a change between the fuel vapor state before the leakage diagnosis and the fuel vapor state after the leakage diagnosis;

wherein the state measurement unit includes:

a measurement passage that includes a throttle;

a stream generating unit for generating a gas stream in the measurement passage;

a pressure detecting unit for detecting pressure in a downstream of the throttle;

a first switching unit for switching between a first measurement state, in which air flows through the measurement passage by opening the measurement passage to the atmosphere, and a second measurement state, in which the mixture flows through the measurement passage by communicating the measurement passage with the canister; and a fuel-vapor-state calculating unit for calculating the fuel vapor state on the basis of a first pressure, which is detected in the first measurement state, and a second pressure, which is detected in the second measurement state, wherein the diagnosis unit includes a second switching unit for facilitating a third measurement state, in which the mixture flows from the canister into the downstream of the throttle while bypassing the throttle, and the diagnosis unit performs the leakage diagnosis on the basis of the first pressure and a third pressure, which is detected in the third measurement state.

2. The leakage diagnosis apparatus according to claim 1, wherein the command unit commands the diagnosis unit to perform the leakage diagnosis when a first time period lapses after stop of the internal combustion engine; and the command unit commands the diagnosis unit to perform the leakage diagnosis again when a second time period lapses after the previous leakage diagnosis under a condition where the evaluating unit performs the previous leakage diagnosis in a state other than the appropriate state.

3. The leakage diagnosis apparatus according to claim 2, wherein the command unit repeatedly commands the diagnosis unit to perform the leakage diagnosis each time the second time period lapses, till the evaluating unit determines the leakage diagnosis to be performed in the appropriate state.

4. The leakage diagnosis apparatus according to claim 2, the second time period is greater than the first time period.

5. The leakage diagnosis apparatus according to claim 1, wherein the evaluating unit determines the leakage diagnosis to be performed in a state other than the appropriate state under the following conditions:

the fuel vapor state after the leakage diagnosis is greater than the fuel vapor state before the leakage diagnosis by a threshold.

6. A leakage diagnosis apparatus for a purge apparatus of an internal combustion engine, the purge apparatus including an adsorbent for temporarily absorbing fuel vapor and desorbing the fuel vapor into an intake passage of the internal combustion engine, the leakage diagnosis apparatus comprising:

a diagnosis unit for performing a leakage diagnosis to detect leakage in the purge apparatus on the basis of pressure in the purge apparatus;

a state measurement unit for measuring a fuel vapor concentration in mixture containing the fuel vapor; and an evaluating unit for evaluating whether the leakage diagnosis is in an appropriate state, where pressure in the purge apparatus becomes stable, on the basis of a change between the fuel vapor concentration before the leakage diagnosis and the fuel vapor concentration after the leakage diagnosis;

wherein the state measurement unit includes:

a measurement passage that includes a throttle;

a stream generating unit for generating a gas stream in the measurement passage;

a pressure detecting unit for detecting pressure in a downstream of the throttle;

a first switching unit for switching between a first measurement state, in which air flows through the measurement passage by opening the measurement passage to the atmosphere, and a second measurement state, in which the mixture flows through the measurement passage by communicating the measurement passage with the canister; and a fuel-vapor-state calculating unit for calculating the fuel vapor state on the basis of a first pressure, which is detected in the first measurement state, and a second pressure, which is detected in the second measurement state, wherein the diagnosis unit includes a second switching unit for facilitating a third measurement state, in which the mixture flows from the canister into the downstream of the throttle while bypassing the throttle, and the diagnosis unit performs the leakage diagnosis on the basis of the first pressure and a third pressure, which is detected in the third measurement state.

7. A method for diagnosing a purge apparatus for purging fuel vapor into an intake passage of an internal combustion engine, the purge apparatus including a canister accommodating an adsorbent for temporarily absorbing fuel vapor produced in a fuel tank and for purging the fuel vapor desorbed from the adsorbent into the intake passage of the internal combustion engine, the method comprising:

performing a leakage diagnosis to detect leakage in the purge apparatus;

measuring a fuel vapor state of mixture containing the fuel vapor desorbed from the adsorbent;

commanding that the leakage diagnosis be performed at a predetermined time; and evaluating whether the leakage diagnosis is in an appropriate state, where pressure in the purge apparatus becomes stable, on the basis of a change between the fuel vapor state before the leakage diagnosis and the fuel vapor state after the leakage diagnosis;

generating a gas stream in a measurement passage that includes a throttle;

detecting pressure in a downstream of the throttle;

switching between a first measurement state, in which air flows through the measurement passage by opening the measurement passage to the atmosphere, and a second measurement state, in which the mixture flows through the measurement passage by communicating the measurement passage with the canister;

calculating the fuel vapor state on the basis of a first pressure which is detected in the first measurement state, and a second pressure, which is detected in the second measurement state; and facilitating a third measurement state, in which the mixture flows from the canister into the downstream of the throttle while bypassing the throttle;

wherein the leakage diagnosis is performed on the basis of the first pressure and a third pressure, which is detected in the third measurement state.

8. A method for diagnosing a purge apparatus for purging fuel vapor into an intake passage of an internal combustion engine, the purge apparatus including an adsorbent for temporarily absorbing fuel vapor and desorbing the fuel vapor into the intake passage of the internal combustion engine, the method comprising:

performing a leakage diagnosis to detect leakage in the purge apparatus on the basis of pressure in the purge apparatus;

measuring a fuel vapor concentration in mixture containing the fuel vapor;

evaluating whether the leakage diagnosis is in an appropriate state, where pressure in the purge apparatus becomes stable, on the basis of a change between the fuel vapor concentration before the leakage diagnosis and the fuel vapor concentration after the leakage diagnosis;

generating a gas stream in a measurement passage that includes a throttle;

detecting pressure in a downstream of the throttle;

switching between a first measurement state, in which air flows through the measurement passage by opening the measurement passage to the atmosphere, and a second measurement state, in which the mixture flows through the measurement passage by communicating the measurement passage with the canister;

calculating the fuel vapor state on the basis of a first pressure, which is detected in the first measurement state, and a second pressure, which is detected in the second measurement state; and facilitating a third measurement state, in which the mixture flows from the canister into the downstream of the throttle while bypassing the throttle;

wherein the leakage diagnosis is performed on the basis of the first pressure and a third pressure, which is detected in the third measurement state.

* * * * *